US005726414A

United States Patent [19]

Kitahashi et al.

[11] Patent Number: 5,726,414

[45] Date of Patent: Mar. 10, 1998

[54] PLASMA TORCH WITH SWIRLING GAS FLOW IN A SHIELDING GAS PASSAGE

[75] Inventors: Masamitsu Kitahashi; Iwao Kurokawa; Mikio Tokunaga; Hiroyuki Tokynaya, all of Kanagawa-ken, Japan

[73] Assignee: Komatsu Ltd., Japan

[21] Appl. No.: 628,666

[22] PCT Filed: Nov. 2, 1994

[86] PCT No.: PCT/JP94/01854

§ 371 Date: Apr. 12, 1996

§ 102(e) Date: Apr. 12, 1996

[87] PCT Pub. No.: WO95/12965

PCT Pub. Date: May 11, 1995

[30] Foreign Application Priority Data

Nov. 2, 1993 [JP] Japan .................................... 5-274310

[51] Int. Cl.$^6$ .................................................... B23K 10/00

[52] U.S. Cl. ............................... 219/121.48; 219/121.51; 219/121.5; 219/75; 313/231.51

[58] Field of Search ......................... 219/121.48, 121.46, 219/121.5, 121.51, 121.52, 74, 75; 313/231.51, 231.31

[56] References Cited

U.S. PATENT DOCUMENTS

| | | | |
|---|---|---|---|
| 4,133,987 | 1/1979 | Lakomsky et al. | 219/121.52 |
| 4,140,892 | 2/1979 | Muller | 219/121.52 |
| 4,521,666 | 6/1985 | Severance, Jr. et al. | 219/121 PY |
| 4,843,282 | 6/1989 | Barakitis et al. | 313/619 |
| 4,919,191 | 4/1990 | Broderson | 219/121.59 |
| 4,928,027 | 5/1990 | Deininger et al. | 310/11 |
| 5,013,885 | 5/1991 | Carkhuff et al. | 219/121.5 |
| 5,023,425 | 6/1991 | Severance, Jr. | 219/121.59 |
| 5,105,061 | 4/1992 | Blankenship | 219/121.52 |
| 5,239,162 | 8/1993 | Haun et al. | 219/121.52 |
| 5,416,296 | 5/1995 | Walters | 219/121.5 |

FOREIGN PATENT DOCUMENTS

| | | |
|---|---|---|
| 0151737 | 12/1975 | Japan . |
| 62-18000 | 1/1987 | Japan . |
| 3135719 | 9/1988 | Japan . |
| 3196374 | 12/1988 | Japan . |
| 3299860 | 12/1988 | Japan . |
| 1135174 | 9/1989 | Japan . |
| 1299777 | 12/1989 | Japan . |
| 5226096 | 9/1993 | Japan . |
| 9102619 | 3/1991 | WIPO . |
| 9419137 | 2/1994 | WIPO . |

*Primary Examiner*—Mark H. Paschall
*Attorney, Agent, or Firm*—Ronald P. Kananen

[57] ABSTRACT

A plasma torch of swirling plasma gas flow type is disclosed in which there are provided an electrode body having a forward end thereof and a nozzle that is arranged to enclose said forward end portion of the electrode and that is spaced therefrom across a plasma gas flow passage, characterized in that at least a portion of the said electrode body at which a pilot arc can be ignited is composed of either of a material that is high in its melting point and a mixture of the said high melting point material with either of a substance that is low in its work function and an oxide of the said substance.

18 Claims, 9 Drawing Sheets

PLASMA TORCH WITH SWIRLING GAS FLOW IN A SHIELDING GAS PASSAGE

TECHNICAL FIELD

The present invention relates to a plasma torch that can be used in welding or cutting with a plasma arc.

BACKGROUND ART

A vast research and development effort for the technique of plasma arc welding has hitherto be conducted in a variety of technical fields because of its unique advantages. Thus, the plasma arc welding technique, when applied to a spot welding process, has been found to enable a large workpiece and a workpiece of complicated configuration to be dealt with by virtue of the fact that its welding operation can be carried out from only one side of such workpieces which are subjected to their resistance spot welding thereby. Also, the plasma arc welding technique, when applied to a seam welding process, has been found to possess a productivity that is several times greater than the TIG welding technique.

A typical plasma torch in the prior art is disclosed in Japanese Laid-Open Utility Model Publication No. Hei 01-135174.

Such a conventional plasma torch unit is, as shown in FIG. 1 of the accompanying drawings hereof, configured to include: a base body a that is constructed as a tubular electrical conductor, a chip c that is held securely to the forward end of the base body a and constructed as an electrical conductor having an opening b which communicates with an inner space of the base body a, an electrode positioning member d that is constructed as an insulator held securely to a base end side of the base body a, and an electrode rod e that is located along an axis extending through a central portion of the opening b of the above mentioned chip c by means of the electrode positioning member d. In at least a portion of the space that extends from the internal space of the base body a to the opening portion of the chip c, there are formed a first gas passage f for causing a plasma gas stream to flow along the electrode rod e and a plurality of second gas passages g that branch from the first gas passage f for passing the plasma gas stream as a swirling or vortex flow around the forward end portion of the electrode rod e.

Notwithstanding its foregoing construction, the conventional plasma torch has been found to be poor in its arc stability because of the fact that while a portion thereof in which the swirling or vortex flow has just been created allows that swirling or vortex flow to be sufficiently enough intensive, thus permitting a leak of the high frequency from the electrode rod e to be prevented, the swirling or vortex flow tends to be weakened at the forward end of the electrode e under the influence of a gaseous flow passing in its axial direction, thus not permitting a leak of the high frequency from the electrode rod e.

In order to obviate this difficulty in such a plasma arc torch construction, a need has been considered to maintain the forward end of the electrode rod e sharpened at all the times. It has been found that this requirement causes a cathodic point (or an anodic point) to be formed at the forward end of the electrode rod e which as a result is rounded as the time elapses, and hence results in a shortened life of the electrode as well as in an instability in the welding quality that is attainable.

A present inventor has conducted a durability test for a conventional plasma torch of the above mentioned construction under welding conditions which are set forth in Table 1 below and has investigated how the electrode and the nozzle are worn off and how the welding quality is altered with the lapse of time.

TABLE 1

| | |
|---|---|
| Nozzle Diameter | 2.4 mm |
| Welding Current | 90 A |
| Welding Duration | 7 seconds |
| Plasma Gas | Ar; 1.8 L/min |
| Shielding Gas | Ar + 7% $H_2$; 7 L/min |
| Standoff Distance | 4.5 mm |
| Crater Treatment (After Heat Treatment) | None |

As a result of the investigation, it has been found that the forward end of an electrode in its configuration commences deteriorating at the time at which first 100 spot welds have been completed and that the size of a molten pool which is an important factor of the welding quality in a spot welding process then comes to be varied. In addition, after 1000 spot welds have been completed by further continuing the durability test, it has been found that a hole is created penetrating through the workpieces as a consequence of an excessive heat input. It is believed that the excessive heat input would have been caused due to an elevation of the arc voltage resulting from the facts that the electrode wear causes its configuration to be altered (i. e. rounded) to make the arc unstable and that the shortened electrode length causes the distance between the electrode and the workpieces to be enlarged.

In contradiction to such a conventional inferior plasma torch, the present inventors have developed an improved plasma torch as shown in FIG. 2 of the accompanying drawings hereof. The improved plasma torch is prepared by flattening the forward end of an electrode holder h composed of copper that is water cooled, embedding in an axial portion of the forward end an electrode i that is composed of a high melting point metal such as tungsten, enclosing this electrode i with the nozzle j at a given spacing therefrom, and constructing the electrode i and a nozzle j so that a gas passage k formed between them may be traversed by a swirling or vortex flow m of the plasma gas. It should be noted here that the inner walls of the above mentioned electrode holder h and the outer walls of the above mentioned nozzle j are water cooled.

In a construction of the plasma torch as mentioned in the preceding paragraph in which the distance between an outer base surface of the electrode holder h and the the nozzle j is the shortest, however, it has been found that there may be developed a pilot arc n between the outer base surface of the electrode holder h and the nozzle j, this arc being then displaced by the swirling or vortex flow m to the electrode i portion and there shifting into a main arc. Then, with the electrode holder h being composed of a low melting point material such as copper, it has been found that a problem arises that a portion at which the pilot arc n develops is melted or vaporized to create a matted and embossed surface there. Also, as a consequence of the fact that a metallic vapor produced from the electrode i is cooled by the nozzle j that is water cooled, to give rise to a scum thereof, which is deposited upon an inner surface of the nozzle j, it has been found that this deposit, if continuingly built up, may bridge, thus, short-circuit, between the electrode i and the nozzle j, resulting in the inability to ignite an acceptable arc.

The present invention has been made in order to resolve these conventional problems and has its object to provide a plasma torch which is capable of preventing a formation of the matted and embossed surface on the electrode holder and a development of the metallic scum deposit built-up on an inner surface of the nozzle, hence a development of the above noted bridging phenomenon, the plasma torch having its electrode which, compared with the conventional one that had its forward end sharpened, can only undergo a change in its configuration which is drastically small with the lapse of time, thereby permitting an arc to be stabilized and the welding quality to be sharply enhanced.

SUMMARY OF THE INVENTION

In order to attain the object mentioned above, there is provided, in accordance with the present invention, a plasma torch which is of a plasma gas swirling type in which there are provided an electrode body having a forward end portion thereof and a nozzle that is constructed to enclose the said forward end of the electrode body and is spaced apart therefrom across a plasma flow passage, and which is characterized in that at least a portion of the said electrode body at which a pilot arc can be ignited is composed of either of a material that is high in its melting point and a mixture of the said high melting point material with either of a substance that is low in its work function and an oxide of the said substance.

According to the above mentioned construction in which in addition to the use of a plasma flow being passed in the form of a swirling or vortex flow, at least a portion of the electrode body at which a pilot arc can be ignited, for example, an area of the said forward end portion of the electrode body which area is the least distant from the nozzle is composed of either of a material that is high in its melting point and a mixture of the said high melting point material with either of a substance that is low in its work function and an oxide of the said substance, it may be seen that a pilot arc is generated between the said forward end portion of the electrode body that is composed, at least in part, of the said high melting point material and the said nozzle while at the same time a main arc is generated between the said forward end and a workpiece body, there will no longer be developed an arc cathodic point (or an arc anodic point) in a region, other than the said forward end portion, which region is composed of a material that is low in its melting point. This will effectively prevent a zone that is other than the said forward end portion and that is, for example, the electrode holder, from being formed with a matted and embossed surface while at the same time preventing the said electrode body and the said nozzle from being bridged (or short-circuited), thus preventing them from being rendered unable to ignite an acceptable arc.

In connection with the above, it should be noted that the said electrode body can be constituted by an electrode holder that is composed of a material which is high in its thermal conductivity; and an electrode that is securely held to or fitted to a forward end of the said electrode holder and that is composed of either of a material which is high in its melting point and a mixture of the said high melting point material with either of a substance which is low in its work function and an oxide of the said substance. And, it should also be noted that the totality of the said electrode body may be composed of either of a material that is high in its melting point and a mixture of the said high melting point material with either of a substance that is low in its work function and an oxide of the said substance.

It should further be noted that a said electrode body may be coated on a surface thereof with either of a material that is high in its melting point and a mixture of the said high melting point material with either of a substance that is low in its work function and an oxide of the said substance, by flame spraying or evaporation thereof, and that a said electrode holder may be coated on a surface thereof with a silver plating or the like.

In a construction as mentioned in the preceding paragraph, it should be noted that the inability to ignite an acceptable arc resulting from the said matted and embossed surface formation or from the said bridging between the electrode and the nozzle will effectively be prevented even in a case in which it is unable to design the least distant spacing between the said electrode body and the said nozzle as lying between the said electrode and the said nozzle.

Also, it has been found that if a said electrode body has a said forward end portion (i. e. electrode portion) that is shaped in a planar or a spherical configuration, the deterioration of the said electrode portion with the lapse of time can be reduced, thereby rendering the change in performance of the said electrode portion (i. e. the welding quality) with the lapse of time drastically reduced.

Also, it has been found that if a said electrode body is formed on a forward end thereof with a recess or a projection, an arc cathodic point (or an arc anodic point) can be fixed at a central region of the said forward end of the electrode body, thereby stabilizing the arc, hence sharply enhancing the welding quality.

Further, it has been found that if there is provided a shielding cap which is designed to enclose a said nozzle and is spaced apart therefrom across a shielding gas passage and there is provided a ring which is designed to produce a swirling or vortex flow of the shielding gas in the said shielding gas passage, there can be developed a plasma gas flow effectively functioning in the axial direction of the plasma torch even should it be of the type in which the plasma gas is passed in the form of a swirling or vortex flow.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention, but to facilitate an explanation and understanding thereof.

In the accompanying drawings.

BEST MODES FOR CARRYING OUT THE INVENTION

Figure 1:
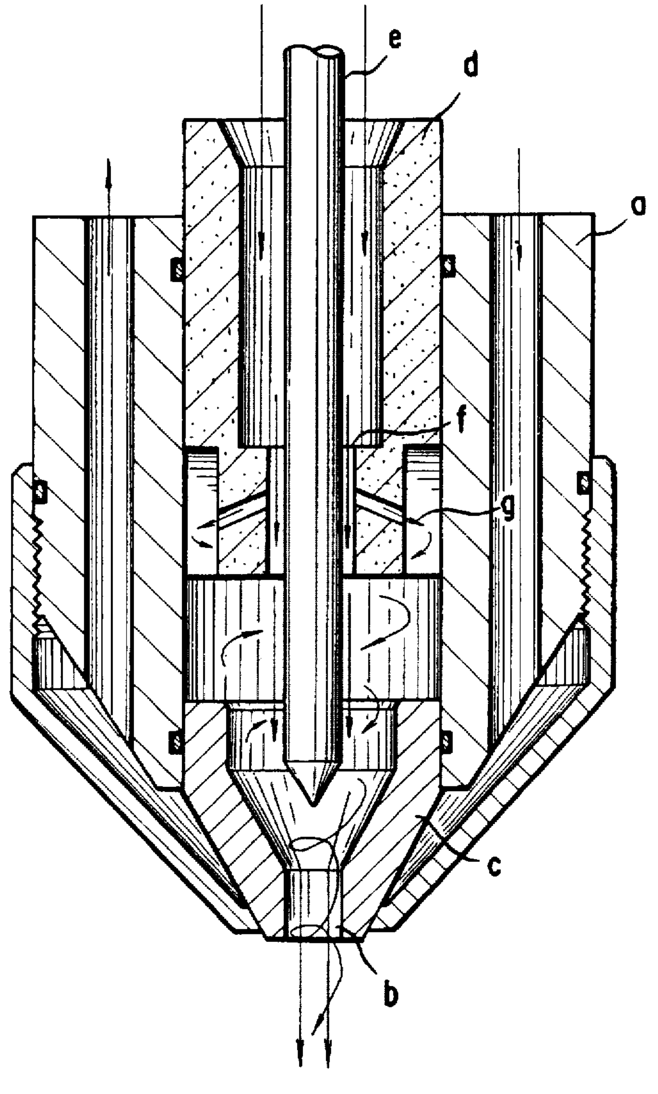
FIG. 1 is a cross sectional view illustrating the essential portion of a plasma torch in the prior art.

Hereinafter, an explanation will be given with respect to suitable embodiments of the plasma torch according to the present invention with reference to the accompanying drawings.

An explanation will now be given of certain embodiments of the present invention with reference to FIG. 3 and following.

Referring now to these Figures, it will be seen that numeral 1 designates an electrode holder having interiorly a coolant water passage 2 and brazed on a forward end thereof with an electrode 3 that is inserted and embedded therein under pressure, the electrode holder 1 and the electrode 3 constituting an electrode body 15. Numeral 4 denotes a nozzle that is designed to enclose a forward end portion of the electrode body 15, that is spaced therefrom across a plasma gas passage 5, that is arranged so as to be coaxial with the electrode body 15 and that is provided with a plasma arc projecting outlet 6. Numeral 7 represents a shielding cap that is arranged to enclose the outer side of the nozzle 4, that is spaced therefrom across a shielding gas passage 8 and that is provided coaxially with the nozzle 4.

It can also be seen that the above mentioned plasma gas passage 5 is provided at an upstream portion thereof with a swirler 9 which is constructed so that its swirling passage 9*a* may be aligned in a plane perpendicular to the axis of the electrode holder 1 or may be configured so as to be inclined slightly towards its forward end side, thereby permitting an intensive swirling or vortex flow of a gas passing through the swirling passage 9*a* to be generated therein.

Further, it can be seen that the above mentioned shielding gas passage 8 is also interiorly provided with a ring 10. The direction in which the gas is blown out of the ring 10 is here determined depending upon the material and the thickness of a pair of workpieces to be welded together. In a case where the shielding gas is to be swirled by the ring 10, for example, in a case where the direction in which the shielding gas is swirled is identical to the direction in which the plasma gas is swirled by the swirler 9, there will be an effect whereby the plasma arc (i. e. jet) is strongly pinched and this will be effective for cutting a workpiece, or welding together a pair of workpieces, which would require a plasma arc of high energy density. And, if the two gases are swirled in mutually opposite directions, it will be apparent that the swirling flow component that is possessed by the plasma arc (i. e. jet) can be alleviated so as to be effective, in welding, to maintain a molten pool in a stabilized state. Thus, this is effective for a spot welding operation in which a large nugget is required and for a seam welding operation in which a thick bead width is necessary.

It should be noted that the above mentioned electrode holder 1 is composed of a material that is high in its thermal conductivity such as copper, and is designed to be cooled by a water coolant passing through the coolant water passage 2. Further, the electrode 3 is composed of a material that is high in its melting point such as tungsten.

And, it should be noted that the electrode 3 is of a size that is sufficient to occupy the entirety of the forward end portion of the electrode holder 1 whereas the distance s between the forward peripheral portion of the electrode 3 and the inner surface of the nozzle 4 is designed to be the shortest distance between the electrode holder 1 and the electrode portion including the electrode 3 so that when the electrode 3 is electrically energized, a pilot arc may be generated at the forward peripheral portion of the electrode 3.

Figure 3:
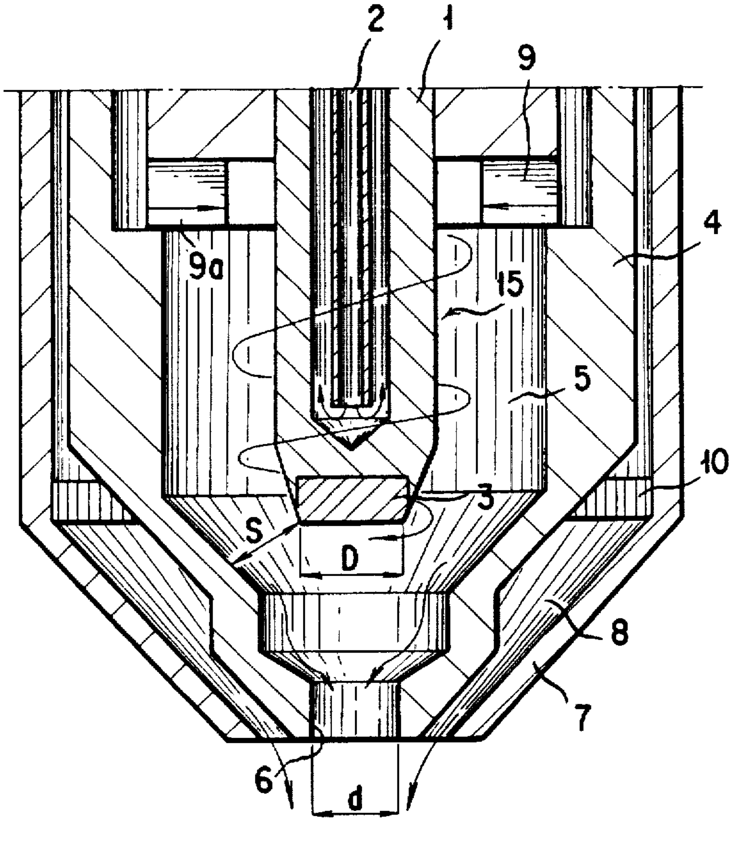
FIG. 3 is a cross sectional view illustrating the essential portion of a first embodiment of the plasma torch according to the present invention.
Figure 4A:
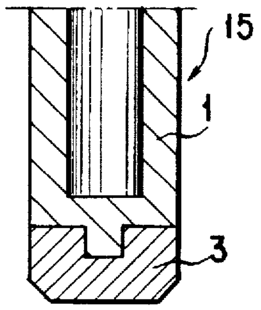
FIGS. 4A to 4C are each a cross sectional view illustrating a modified example of the electrode body in the above mentioned first embodiment.
Figure 4B:
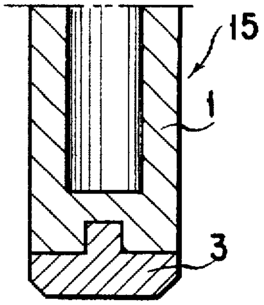

While the electrode holder 1 and the electrode 3 mentioned above may be constructed and coupled together as shown in FIG. 3 so that the entirety of the electrode 3 may be embedded in the forward end portion of the electrode holder 1, it should be noted that the electrode 3 may be fittedly attached to the forward end surface of the electrode holder 1 as shown in FIGS. 4A and 4B.

Figure 4C:
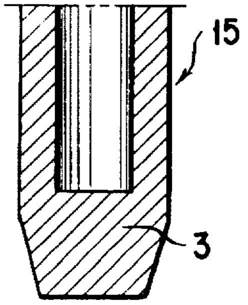

Also, as shown in FIG. 4C, it should be noted that the entire electrode body 15 may be composed of a material that is high in its melting point such as tungsten or of a mixture of the high melting point material with a substance that is low in its work function or with an oxide of this substance, and may be provided interiorly with a cooling space (e. g., a space for cooling with water).

An explanation will now be given with respect to a variety of examples of the electrode body 15.

EXAMPLE 1

Figure 5A:
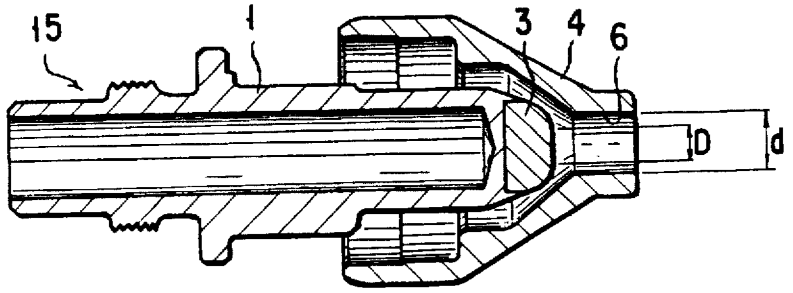
FIGS. 5A to 5F are each a cross sectional view illustrating a modified example of the electrode body having a forward end thereof that is shaped in a planar configuration.

As shown in FIG. 5A, the electrode 3 that was held securely to the forward end of the electrode holder 1 had a forward end that was shaped in a planar configuration.

The material of the electrode holder: copper

The material of the electrode: tungsten with 2% of thoria

The material of the nozzle: copper

The diameter of the planar portion of the forward end of the electrode: 2 mm

The diameter of the nozzle: 4 mm

It has been found that it is necessary that the diameter d of the planar portion of of the forward end of the electrode 3 be smaller than the diameter D of the nozzle (i. e. $d \leqq D$). If the diameter d of the planar portion of the forward end of the electrode is greater than the diameter D of the nozzle, it has been found that a dual arcing may be generated at the time at which an arc is ignited. It has also been found that if the forward end of the electrode is shaped into a planar configuration, its deformation (i. e. deterioration) with the lapse of time can be reduced to a minimum.

EXAMPLE 2

Figure 5B:
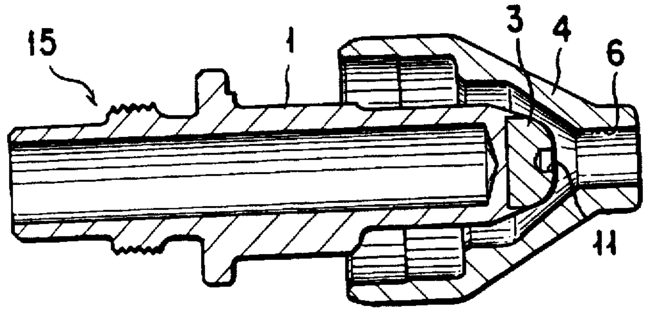

As shown in FIG. 5B, the electrode 3 had a planar forward end, which was then formed thereon with an edge portion 11.

The material of the electrode holder: copper

The material of the electrode: tungsten with 2% of thoria

The material of the nozzle: copper

The diameter of the planar portion of the forward end of the electrode: 2 mm

The diameter of the edge portion (i. e. a drilled hole): 1.5 mm

The diameter of the nozzle: 4 mm

It will be seen that the electrode can be formed on its forward end with the edge portion 11 by boring a hole in the electrode with a drill or by milling the electrode with a milling machine. By providing such a portion that is edge shaped on the electrode, it has been found that a pilot arc can smoothly be shifted into a main arc owing to the fact that the temperature is easily elevated at the instant at which an arc is discharged and that as a result the occurrence of an abnormal arc can be prevented and it becomes possible to enhance the life of the electrode 3. Further, it has been found that there results an advantage that an arc which is a main arc that has been shifted from a pilot arc tends to be stabilized owing to the fact that the arc has its cathodic point which is readily fixed.

Figure 5C:
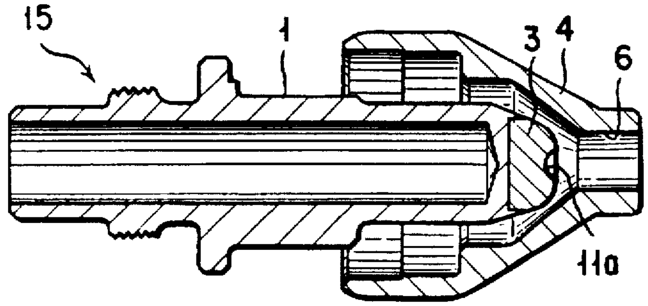
Figure 5D:
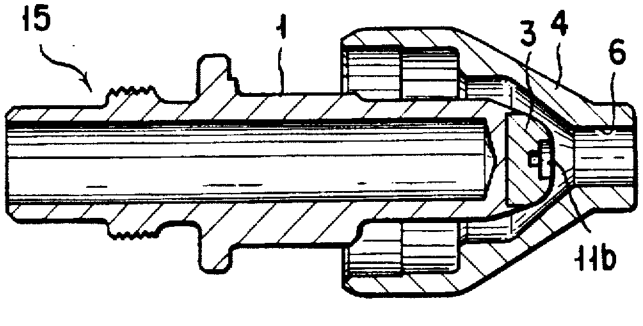
Figure 5E:
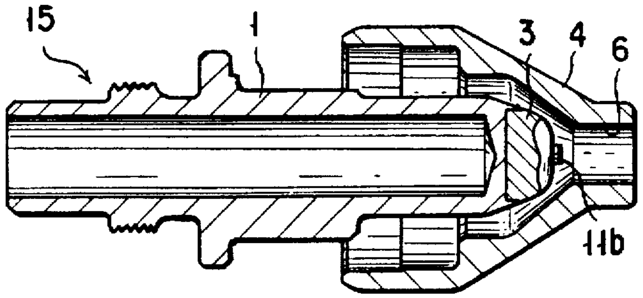
Figure 5F:
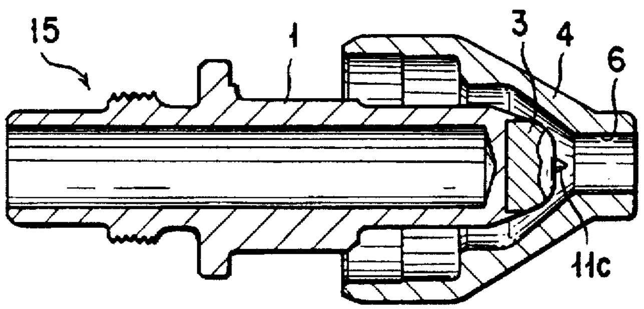

It should be noted that the electrode configuration that has an effect as described above in connection with FIG. 5B can be implemented by the formation of an arcuate hole 11 on the forward end of the electrode 3 as shown in FIG. 5C, the provision of a stepped hole 11_b_ thereon as shown FIG. 5D, the formation of a cylindrical projection 11_b_ on the forward end of the electrode 3 as shown in FIG. 5E, or alternatively the provision of a conical projection 11_c_ thereon as shown in FIG. 5F. In this connection, it has also be found that in an embodiment as shown in FIG. 5D, as the edge portion of the outer hole no longer wears off, the cathodic point of the arc will come to be fixed at the edge portion of the inner hole, thereby enabling the life of the electrode to be further lengthened.

EXAMPLE 3

Figure 6A:
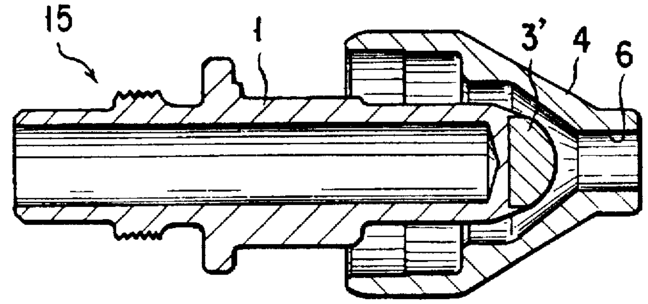
FIG. 6A to 6E are each a cross sectional view illustrating a modified example of the electrode body having a forward end thereof that is shaped in a spherical configuration.

As shown in FIG. 6A, an electrode 3' had a forward end that was contoured in a spherical configuration.

The material of the electrode holder: copper

The material of the electrode: tungsten with 2% of ceria

The material of the nozzle: copper

The diameter of the nozzle: 4 mm

The radius of the spherical forward end of the electrode: 3.5 mm

If the forward end of the electrode 3' is contoured in a spherical configuration, it has been found that there can be generated a main arc which is quickly turned from a pilot arc that has been generated on the spherical electrode surface and then can smoothly be shifted to the spherical end point of the electrode. This phenomenon that is effected without any difficulty, even with a plasma gas which is in a relatively weak swirling or vortex flow, has been found to be highly effective when a pair of workpieces need to be welded together with a plasma gas flow that is reduced in its flow rate.

EXAMPLE 4

Figure 6B:
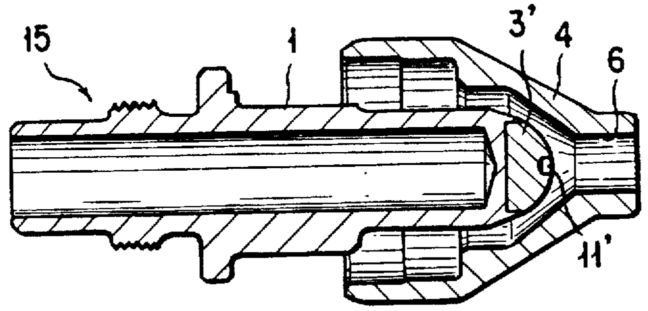

As shown in FIG. 6B, the electrode 3' had its forward end that was contoured in a spherical electrode configuration and was formed thereon with an edge portion 11'.

The material of the electrode holder: copper

The material of the electrode: tungsten with 2% of ceria

The diameter of the edge portion (i. e. a drilled hole): 1.5 mm

The material of the nozzle: copper

The diameter of the nozzle: 4 mm

The radius of the spherical forward end of the electrode: 3.5 mm

By forming the forward end of the electrode 3' in a spherical configuration, it has been found that there can be generated a main arc which is quickly turned from a pilot arc that has been generated on the spherical electrode surface and then can smoothly be shifted to the spherical end point of the electrode. This phenomenon that is effected without any difficulty, even with a plasma gas which is in a relatively weak swirling or vortex flow, has been found to be highly effective when a pair of workpieces need to be welded together with a plasma gas flow that is reduced in its flow rate.

Furthermore, it has been found that by providing the electrode with an edge portion on its forward end, the stability of an arc which has been established as a main arc can be increased.

Figure 6C:
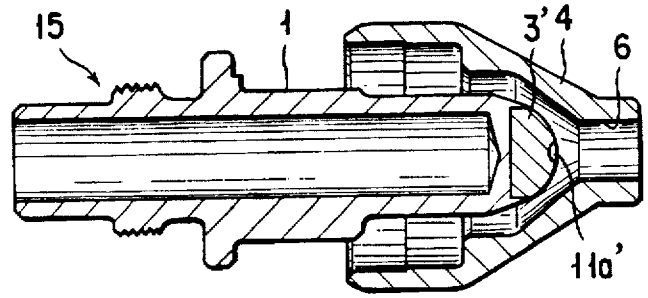
Figure 6D:
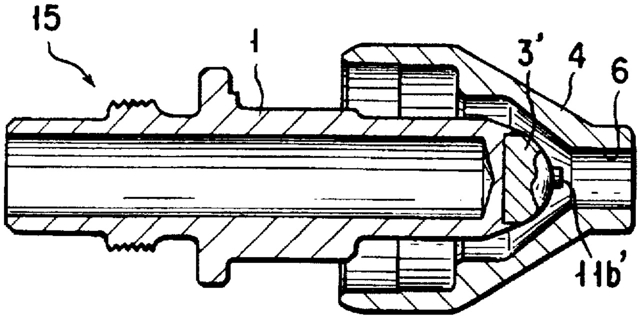
Figure 6E:
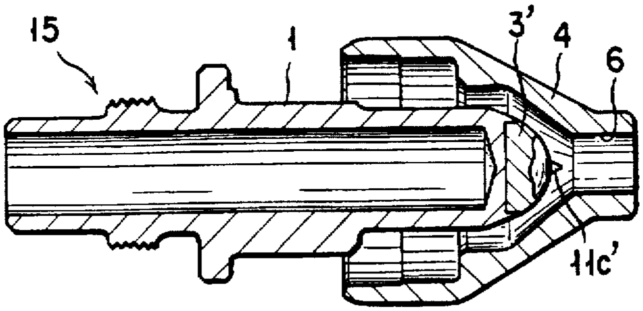

It should be noted that the electrode configuration that has an effect as described above in connection with FIG. 6B can be implemented by the formation of an arcuate hole 11_a_' on the forward end of the electrode 3' as shown in FIG. 6C, the provision of a cylindrical projection 11_b_' on the forward end of the electrode 3' as shown in FIG. 6D, or alternatively the provision of a conical projection 11_c_' thereon as shown in FIG. 6E.

In this connection, it has also been found that the electrode 3 may be used that is composed of, other than any of the materials mentioned above, tungsten with 2% of lanthana.

EXAMPLE 5

Figure 7:
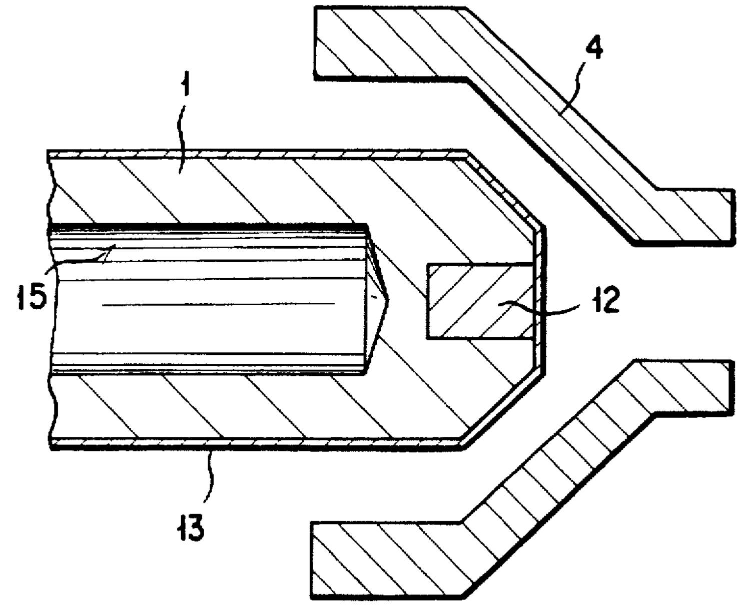
FIG. 7 is a cross sectional view illustrating a modified embodiment of the electrode body, whose totality has a coating applied thereto.

As shown in FIG. 7, a whole surface of the electrode holder 1 which had an electrode 12 embedded in a surface zone thereof, that is, the electrode body 15 was coated with a coating layer 13 of a material that is high in its melting point, or a mixture of the high melting point material with a substance that is high in its work function or with an oxide of that substance, by the flame spraying or the evaporation thereof.

The material of the electrode holder: copper

The material of the electrode: tungsten with 2% of thoria

The electrode coating material: tungsten with 2% of thoria

The material of the nozzle: copper

The diameter of the nozzle: 4 mm

Thus, in a case where it is unable to design the shortest spacing between the electrode body 15 and the nozzle 4 as lying between the electrode 12 and the nozzle, it should be noted that a material that is high in its melting point (such as tungsten with 2% of thoria) which is like the material of the electrode 12, can be coated over the entire forward end surface, including the surface of the electrode 12, of the electrode holder 1. It has been found that this will allow the electrode holder 1 to be prevented from being deteriorated by an evaporation and so forth, and will at the same time prevent the surface of the electrode holder 1 from deteriorating into a matted and embossed surface and prevent a failure in the ignition arising from bridging between the electrode 12 and the nozzle 4.

Figure 8:
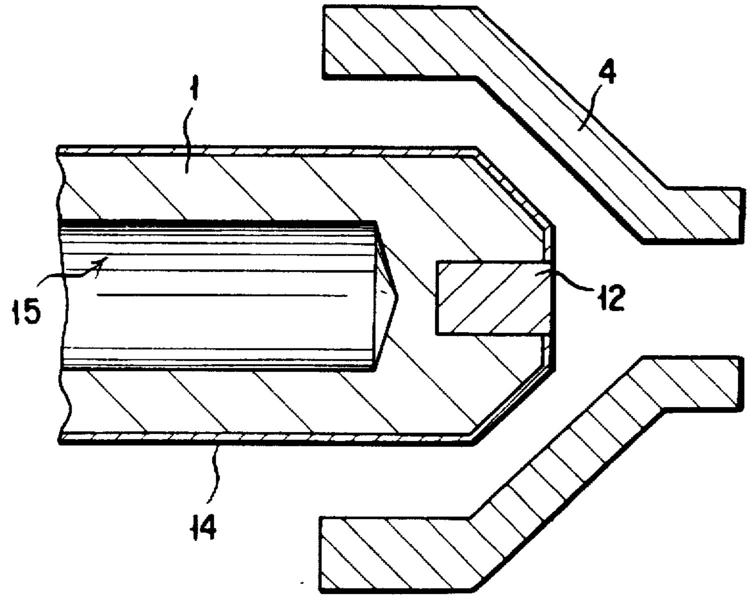
FIG. 8 is a cross sectional view illustrating a modified embodiment of the electrode body in which an electrode holder has a coating applied thereto.

Also, as shown in FIG. 8, it should be noted that a silver plating 14 may be applied to the surfaces of the electrode holder 1. In this case, the electrode 1 can be matted and embossed exclusively on a forward end portion thereof. The reason for this is that while an arc has a property that it will be stabilized if its cathodic point lies on an oxide, owing to the fact that silver reduced the oxide at a high temperature the cathodic point will be hard to exist on the silver plated electrode holder and, as a result, will tend to be displaced towards the electrode 12, thereby causing the arc to be concentrated on a forward end portion of the electrode, thus preventing the electrode holder 1 from being matted and embossed on a surface thereof.

The material that is high in its thermal conductivity which is used to constitute the electrode holder and the nozzle in each of the above mentioned examples may, other than copper, include silver, gold, aluminum and an alloy of each of these metals.

Also, the material that is high in its melting point which is used to constitute the electrode may, other than tungsten, include tantalum, molybdeum, osmium, rhenium, lutetium, iridium and an alloy of each of these metals.

Also, the substance that is low in its work function which is to be added to a high melting point material as mentioned above may include thorium, barium, cesium, cerium, lanthanum, yttrium and zirconium.

An endurance experiment for Example 2 shown in connection with FIG. 5B, among the various Examples mentioned above, was conducted and its results are set forth below.

The Outline of Experiment

In order to prevent a development of the state in which an arc is unable to be ignited because of an occurrence of bridging between the electrode and the nozzle, an improvement was contrived in the electrode configuration. By forming the electrode in a configuration as set forth below, it has been found that a good result can be obtained.

1) So that a pilot arc may be generated on a tungsten material, a portion of the electrode at which the distance between the electrode and the nozzle is the shortest is made up from the tungsten material.

2) So that an arc may readily be stabilized, the electrode forward end is formed on a central region thereof with an edge portion.

Then, an investigation was conducted with respect to the endurable electrode life for an electrode of this configuration.

Target Value: 50000 times which is the arc ignition number that represents the electrode life in a resistance spot welding machine.

Endurance Test Result: The life of 50000 times was achieved. At this point where it was difficult to turn a pilot arc to a main arc, the number was deemed to be the life.

Up to 50000 spots, any change in the welding result with the lapse of time was not discerned.

Contents of Experiment

The actions 1) and 2) which are set forth below were repeated until around 50000 spots were completed.

1) An arc is delivered to a water cooled Cu target under the conditions and in the sequence, which are listed in Table 2, and the sequence is repeated 10000 times to advance the wear.

2) Welding is carried out on a 80 mm×40 mm plate under the conditions set forth in Table 3, and the resultant quality is evaluated. The relative relationship between the electrode and the nozzle which were used in the experiment is shown in FIG. 5B.

TABLE 2

| | | | |
|---|---|---|---|
| Torch Attitude | Downwards | Nozzle Diameter | 4 mm |
| Anode | Water Cooled Cu Target | Welding Current | 90 A |
| | | Main Current On Time | 0.5 sec |
| | | Current Off Time | 0.5 sec |
| Plasma Gas | Ar + 7% $H_2$ (4.5 L/min) | Standoff Distance | 6.5 mm |
| Assist. Gas | Ar + 7% $H_2$ (10 L/min) | Pilot Current | 15 A |

TABLE 3

| | | | | |
|---|---|---|---|---|
| Torch Att. | Downwards | N. D. | | 4 mm |
| Anode (Welding Material) | SPH (SS400) t2.3 (Torch Side; Upper Side) + t2.3 (Lower Side) Gap: 0 mm | W. C. | | 90 A |
| | | M. C. D. | | 6.0 seconds |
| | | Post Heat | C. Off | 2.5 sec. |
| | | | C. On | 90 A; 0.1 sec. |
| Plasma Gas | Ar + 7% $H_2$ (4.5 L/min) | Standoff Distance | | 6.5 mm |
| Assist. Gas | Ar + 7% $H_2$ (10 L/min) | Pilot C. | | 15 A |

Note that Att.: Attitude;
N. D.: Nozzle Diameter;
W. C.: Welding Current;
M. C. D.: Main Current Duration; and
C.: Electric Current Experimental Results The respective changes in appearance of the electrode and the nozzle with the lapse of time as well as the welding results are summarized below.

1) The matted and embossed wear of the electrode was slight to the effect that there was little fear that a bridging might be induced between the electrode and the nozzle.

2) A change of the welding result with the lapse of time was almost not discernible.

Figure 2:
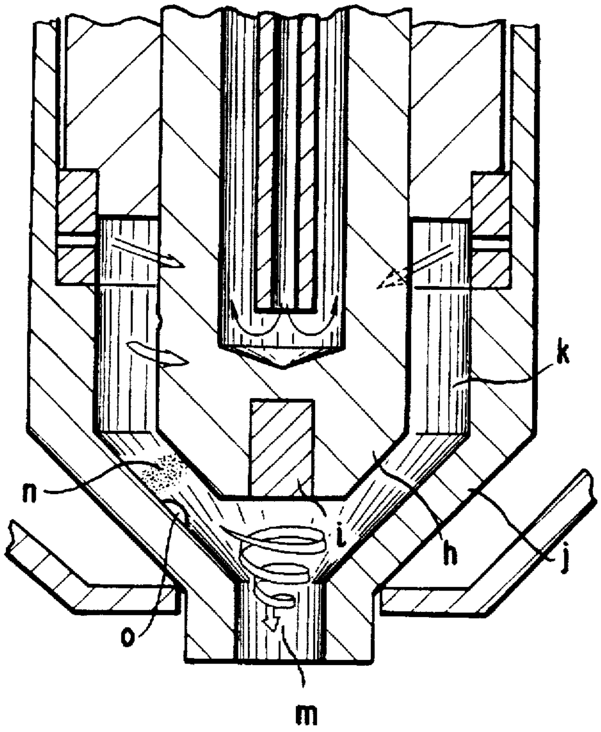
FIG. 2 is a cross sectional view illustrating the essential portion of another plasma torch in the prior art.

It has thus been found that the use of a construction as shown in FIG. 5B can allow 50000 times representing the electrode life to be achieved. Noting the fact that a prior art construction as shown in FIG. 2 was found to only allow 3600 times representing its electrode life, it follows that an increase in the electrode life more than 10 times has now been achieved. Furthermore, its has been found that no problem arises with respect to the stability in a welding result and the insulation between an electrode and a nozzle.

While the present invention has hereinbefore been described with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

What is claimed is:

1. A plasma torch of a plasma gas swirling flow type in which there are provided an electrode body having a forward end thereof and a nozzle that is arranged to enclose said forward end portion of the electrode and that is spaced therefrom across a plasma gas flow passage, characterized in that at least a portion of said electrode body at which a pilot arc can be ignited is composed of either of a material that is high in its melting point and a mixture of said high melting point material with either of a substance that is low in its work function and an oxide of said substance, and further characterized in that there is provided a shielding cap which is arranged to enclose said nozzle and is spaced therefrom across a shielding gas passage and that there is provided a ring which is configured to produce a swirling flow of a shielding gas in said shielding gas passage in a direction opposite to a direction in which said plasma gas swirls.

2. A plasma torch as set forth in claim 1, characterized in that said electrode body is coated on a surface thereof with either of said high melting point material and said mixture of the high melting point material with either of said substance that is low in its work function and said oxide of the substance, by flame spraying or evaporation thereof.

3. A plasma torch as set forth in claim 1, characterized in that said electrode holder is coated on a surface thereof with a silver plating.

4. A plasma torch as set forth in any one of claims 1 to 3, characterized in that said electrode body is formed with a forward end portion thereof that is in a planar configuration.

5. A plasma torch as set forth in any one of claims 1 to 3, characterized in that said electrode is formed with a forward end portion thereof that is in a spherical configuration.

6. A plasma torch as set forth in any one of claims 1 to 3, characterized in that said electrode body is formed on a forward end thereof with either of a recess and a projection.

7. A plasma torch as set forth in any one of claims 1 to 6, characterized in that there is provided a shielding cap which is constructed to enclose said nozzle and which is spaced therefrom across a shielding gas passage; and that there is provided a ring in said shielding gas passage for swirling a shielding gas therein.

8. A plasma torch as set forth in claim 7, characterized in that said shielding gas is swirled in a direction that is identical to a direction in which said plasma gas is swirled.

9. A plasma torch of a swirling plasma gas flow type, comprising:

an electrode body having a forward end;

a nozzle constructed to enclose said forward end of the electrode and spaced therefrom across a plasma flow passage;

said electrode body comprising an electrode holder composed of a material that is high in its thermal conductivity, and an electrode which is secured to a forward end of said electrode holder and composed of either a material that is high in its melting point and a mixture of said high melting point material with either of a substance that is low in its work function and an oxide of said substance; and means for swirling a shielding gas in a shielding gas passage between a shielding cap and said nozzle, said shielding gas flowing in a direction that is opposite to a direction in which said plasma gas is swirled in the plasma flow passage.

10. A plasma torch as set forth in claim 9, characterized in that said electrode body is constituted by:

an electrode holder which is composed of a material that is high in its thermal conductivity; and an electrode which is securely held to or fitted to said forward end position of the electrode and which is composed of either of a material that is high in its melting point and a mixture of said high melting point material with either of a substance that is low in its work function and an oxide of said substance.

11. A plasma torch as set forth in claim 9, characterized in that a totality of said electrode body is composed of either of a material that is high in its melting point and a mixture of said high melting point material with either of a substance that is low in its work function and an oxide of said substance.

12. A plasma torch as set forth in claim 9, characterized In that said electrode body is coated on a surface thereof with either of a material that is high in its melting point and a mixture of said high melting point material with either of a substance that is low in its work function and an oxide of said substance, by either of flame spraying and evaporation thereof.

13. A plasma torch as set forth in claim 10, characterized in that a surface of said electrode holder has a silver plating applied thereto.

14. A plasma torch as set forth in claim 9, characterized in that said forward end portion of the electrode body Is shaped In a planar configuration.

15. A plasma torch as set forth in claim 9, characterized in that said forward end portion is shaped in a spherical configuration.

16. A plasma torch as set forth in claim 9, characterized in that said forward end portion is edged by forming thereon either of a recess and a projection.

17. A method of providing a plasma torch of a swirling plasma gas flow type, comprising the steps of:

forming an electrode body having a forward end;

enclosing said forward end of the electrode with a nozzle spaced therefrom across a plasma flow passage;

forming said electrode body comprising an electrode holder composed of a material that is high in its thermal conductivity, and securing an electrode to a forward end of said electrode holder and composed of either a material that is high in its melting point and a mixture of said high melting point material with either of a substance that is low in its work function and an oxide of said substance; and swirling said shielding gas in a shielding gas passage between a shielding cap and said nozzle in a direction that is opposite to a direction in which said plasma gas is swirled.

18. The method as set forth in claim 17, including a step of passing said plasma gas in a swirling gaseous flow through said shielding gas passing in the plasma torch toward the workpiece while electrically energizing said electrode to activate said plasma torch to acto on said workpiece across a processing gap between a workpiece body and said plasma torch.

* * * * *